United States Patent
Takahashi

(10) Patent No.: US 12,019,138 B2
(45) Date of Patent: Jun. 25, 2024

(54) BEAM FORMATION DEVICE, RADAR DEVICE, AND BEAM FORMATION METHOD

(71) Applicant: Mitsubishi Electric Corporation, Tokyo (JP)

(72) Inventor: Ryuhei Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 511 days.

(21) Appl. No.: 17/328,349

(22) Filed: May 24, 2021

(65) Prior Publication Data

US 2021/0278517 A1 Sep. 9, 2021

Related U.S. Application Data

(63) Continuation of application No. PCT/JP2019/000903, filed on Jan. 15, 2019.

(51) Int. Cl.
*G01S 13/04* (2006.01)
*H01Q 3/26* (2006.01)

(52) U.S. Cl.
CPC .......... *G01S 13/04* (2013.01); *H01Q 3/2605* (2013.01)

(58) Field of Classification Search
CPC .............................. G01S 13/04; H01Q 3/2605
See application file for complete search history.

(56) References Cited

U.S. PATENT DOCUMENTS

| | | | |
|---|---|---|---|
| 6,822,606 B2* | 11/2004 | Ponsford | G01S 3/74 342/159 |
| 7,145,503 B2 | 12/2006 | Abramovich et al. | |
| 2003/0142011 A1 | 7/2003 | Abramovich et al. | |
| 2004/0178951 A1* | 9/2004 | Ponsford | G01S 7/32 342/194 |
| 2011/0012787 A1 | 1/2011 | Na et al. | |
| 2012/0218139 A1* | 8/2012 | Suzuki | G01S 3/74 342/189 |

OTHER PUBLICATIONS

Extended European Search Report dated Nov. 29, 2021 in European Patent Application No. 19 909 707.2.
Office Action dated May 3, 2022 issued in corresponding Canadian Patent Application No. 3,122,743.

* cited by examiner

*Primary Examiner* — Peter M Bythrow
*Assistant Examiner* — Nazra Nur Waheed
(74) *Attorney, Agent, or Firm* — Birch, Stewart, Kolasch & Birch, LLP

(57) ABSTRACT

This beam formation device includes: a Doppler bin detection unit that detects a target Doppler bin which is a Doppler bin in which a target signal is present, from a correlation matrix calculated by a correlation matrix calculation unit and a reception signal vector calculated by a Doppler analysis unit; a target signal removal unit that removes, from the correlation matrix calculated by the correlation matrix calculation unit, the target signal in the target Doppler bin detected by the Doppler bin detection unit and thereby calculates a target-signal-removed correlation matrix from which the target signal has been removed; and a weighting calculation unit that calculates an adaptive weighting of the reception signal vector from the target-signal-removed correlation matrix calculated by the target signal removal unit. A beam formation unit forms an adaptive beam from the reception signal vector calculated by the Doppler analysis unit and the adaptive weighting calculated by the weighting calculation unit.

7 Claims, 6 Drawing Sheets

BEAM FORMATION DEVICE, RADAR DEVICE, AND BEAM FORMATION METHOD

CROSS REFERENCE TO RELATED APPLICATIONS

This application is a Continuation of PCT International Application No. PCT/JP2019/000903, filed on Jan. 15, 2019, all of which is hereby expressly incorporated by reference into the present application.

TECHNICAL FIELD

The present invention relates to a beam formation device, a radar device, and a beam formation method for forming an adaptive beam.

BACKGROUND ART

A high frequency surface wave radar (HFSWR) is a radar that detects an over-the-horizon target beyond the horizon by utilizing the characteristics of short radio waves that propagate along the surface of the sea.

A transmission wave, which is a radio wave radiated from the HFSWR, propagates along the surface of the sea and is reflected on the target or the like on or above the sea. The transmission wave reflected by the target or the like is received by the HFSWR as a target signal.

A portion of the transmission wave radiated from the HFSWR propagates to the sky and is reflected by the ionosphere in the atmosphere. The transmission wave reflected by the ionosphere is received by the HFSWR as an ionospheric clutter.

When the HFSWR receives a radio wave including a mix of the target signal and the ionospheric clutter in a range-Doppler cell, the signal to clutter plus noiser ratio (SCNR) is deteriorated, so that performance for detecting the target is deteriorated.

As a method for addressing deterioration in performance for detecting a target, there is a method of generating an adaptive beam formed with a null in the direction of arrival of the ionospheric clutter and receiving the target signal arriving in the main beam of the generated adaptive beam.

In the above method, adaptive weighting used for forming the adaptive beam is obtained for each range bin in order to suppress ionospheric clutters having different characteristics for each range bin. However, when the HFSWR forms an adaptive beam using the adaptive weighting obtained for each range bin in a case where the target signal is mixed in a reception signal for each range bin including the ionospheric clutter, the target signal may also be suppressed together with the ionospheric clutter.

Patent Literature 1 below discloses a radar that avoids a situation in which a target signal is suppressed together with an ionospheric clutter.

When receiving a radio wave including the ionospheric clutter and the target signal by a reception array, the radar disclosed in Patent Literature 1 forms a beam from a reception signal of the radio wave using a set weighting, and calculates a Doppler spectrum from the formed beam.

The Doppler spectrum calculated from the formed beam includes not only the Doppler spectrum of the target signal having peak power but also the Doppler spectrum of the ionospheric clutter having a wider bandwidth than the Doppler spectrum of the target signal.

The radar disclosed in Patent Literature 1 compares the power of the calculated Doppler spectrum and a threshold, and searches for a peak power larger than the power of the Doppler spectrum of the ionospheric clutter in the calculated Doppler spectrum. The peak power larger than the power of the Doppler spectrum of the ionospheric clutter is the peak power of the Doppler spectrum of the target signal.

The radar disclosed in Patent Literature 1 forms an adaptive beam for each range bin by using a reception signal other than the reception signal of a Doppler bin corresponding to the peak power obtained through the search among the reception signals for each range bin including the ionospheric clutter.

CITATION LIST

Patent Literatures

Patent Literature 1: U.S. Pat. No. 7,145,503

SUMMARY OF INVENTION

Technical Problem

When the peak power of the Doppler spectrum of the target signal is smaller than the power of the Doppler spectrum of the ionospheric clutter, the peak power of the Doppler spectrum of the target signal may be buried in the power of the Doppler spectrum of the ionospheric clutter. Therefore, in the radar disclosed in Patent Literature 1, when the peak power of the Doppler spectrum of the target signal is smaller than the power of the Doppler spectrum of the ionospheric clutter, it is difficult to detect the peak power of the Doppler spectrum of the target signal even by comparing the calculated power of the Doppler spectrum and the threshold.

The radar disclosed in Patent Literature 1 has a problem that, when the peak power of the Doppler spectrum of the target signal cannot be detected, the situation where the target signal is suppressed together with the ionospheric clutter cannot be avoided.

The present invention has been made to solve the above problem, and an object of the present invention is to provide a beam formation device, a radar device, and a beam formation method, each of which can avoid a situation in which, even if the peak power of the Doppler spectrum of the target signal is smaller than the power of the Doppler spectrum of the ionospheric clutter, the target signal is suppressed together with the ionospheric clutter.

Solution to Problem

The beam formation device according to the present disclosure includes: processing circuitry to calculate a Doppler spectrum from a reception signal of each of a plurality of reception antennas, and to calculate a reception signal vector including the Doppler spectrum calculated from the reception signal of each of the reception antennas, to calculate a correlation matrix regarding the reception signal vector, to detect a target Doppler bin that is a Doppler bin in which a target signal is present from the correlation matrix and the reception signal vector, to remove, from the correlation matrix, the target signal in the target Doppler bin so as to calculate a target-signal-removed correlation matrix from which the target signal has been removed, to calculate an adaptive weighting of the reception signal vector from the target-signal-removed correlation matrix, and to form an adaptive beam from the reception signal vector and the adaptive weighting.

Advantageous Effects of Invention

According to the present disclosure, the beam formation device includes: the processing circuitry to detect a target Doppler bin which is a Doppler bin in which a target signal is present, from the correlation matrix and the reception signal vector, to remove, from the correlation matrix, the target signal in the target Doppler bin and thereby calculates a target-signal-removed correlation matrix from which the target signal has been removed, and calculates an adaptive weighting of the reception signal vector from the target-signal-removed correlation matrix. The processing circuitry forms an adaptive beam from the reception signal vector and the adaptive weighting. Accordingly, the beam formation device according to the present disclosure can avoid a situation in which, even if the peak power of the Doppler spectrum of the target signal is smaller than the power of the Doppler spectrum of the ionospheric clutter, the target signal is suppressed together with the ionospheric clutter.

BRIEF DESCRIPTION OF DRAWINGS

FIG. 3 is a diagram showing a hardware configuration of a computer when the signal processing unit 2 and the target detection unit 9 are achieved by software, firmware, or the like.

DESCRIPTION OF EMBODIMENTS

In order to describe the present invention in more detail, a mode for carrying out the present invention will now be described with reference to the accompanying drawings.

First Embodiment

Figure 1:
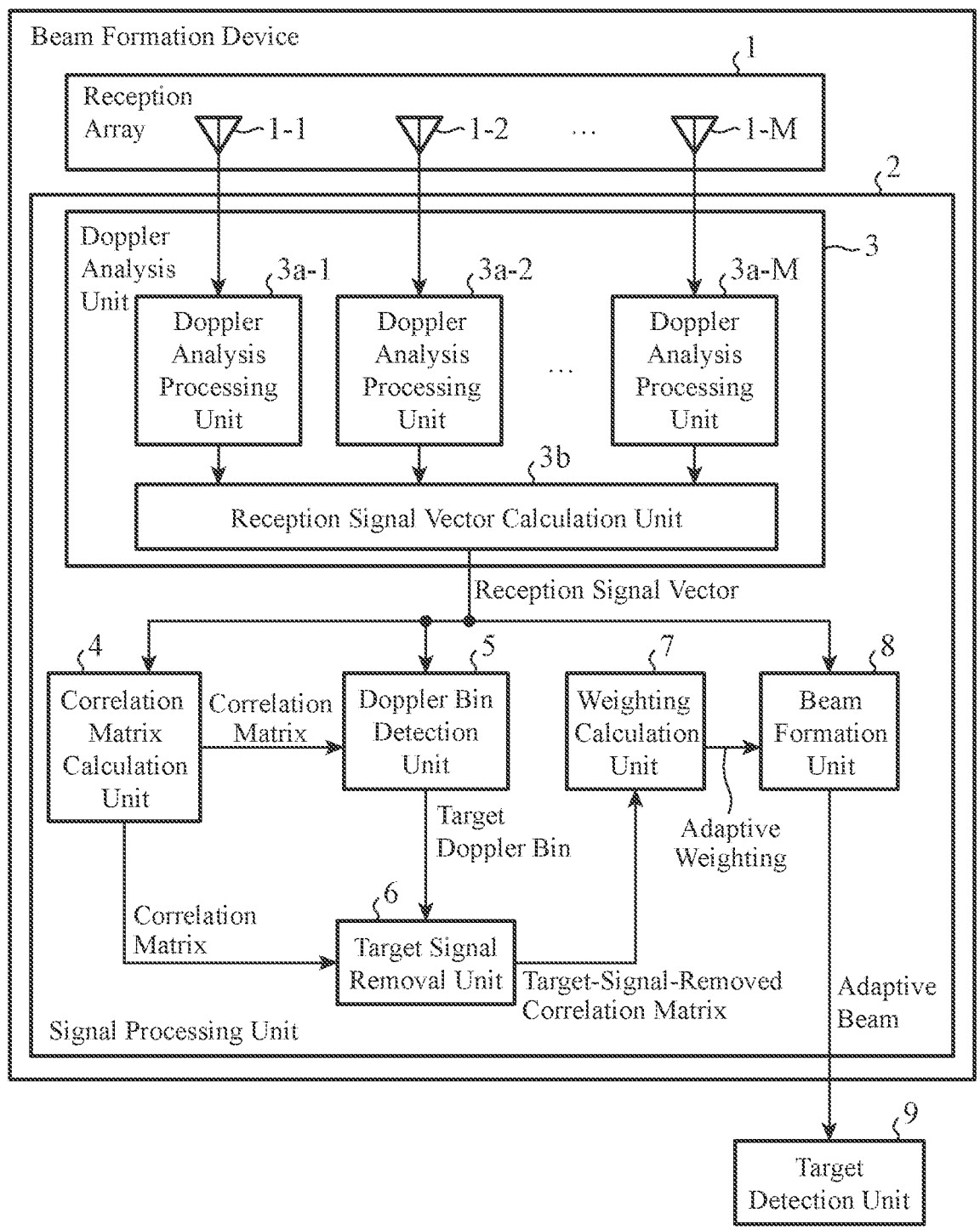
FIG. 1 is a diagram showing a configuration of a radar device including a beam formation device according to a first embodiment.

FIG. 1 is a diagram showing a configuration of a radar device including a beam formation device according to a first embodiment.

Figure 2:
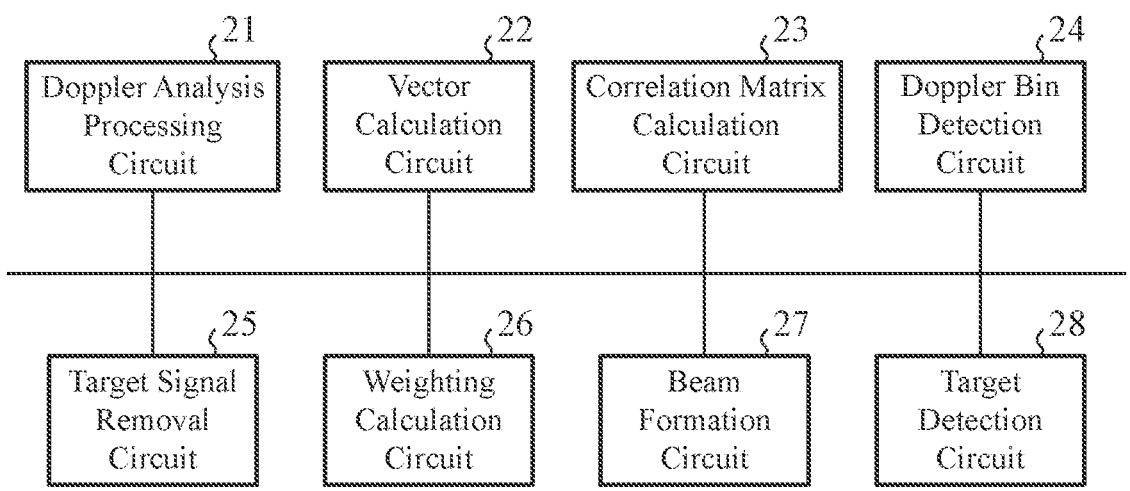
FIG. 2 is a hardware configuration diagram showing hardware of a signal processing unit 2 and a target detection unit 9 in the beam formation device according to the first embodiment.

FIG. 2 is a hardware configuration diagram showing hardware of a signal processing unit 2 and a target detection unit 9 in the beam formation device according to the first embodiment.

In FIGS. 1 and 2, a reception array 1 has M ("M" is an integer greater than or equal to 2) reception antennas 1-$m$ (m=1, M).

The reception antenna 1-$m$ receives a target signal and an ionospheric clutter, and outputs a reception signal including the target signal and the ionospheric clutter to a Doppler analysis unit 3.

A transmission antenna or the like (not shown) of the radar device radiates, for example, a shortwave radio wave as a transmission wave. The target signal is a reflected wave of the transmission wave reflected on a target on or above the sea and returned to the radar device, after the transmission wave is radiated from the transmission antenna and propagates along the surface of the sea.

The ionospheric clutter is a reflected wave of the transmission wave reflected on the ionosphere in the atmosphere and returned to the radar device, after the transmission wave is radiated from the transmission antenna and propagates to the sky.

The signal processing unit 2 includes a Doppler analysis unit 3, a correlation matrix calculation unit 4, a Doppler bin detection unit 5, a target signal removal unit 6, a weighting calculation unit 7, and a beam formation unit 8.

The Doppler analysis unit 3 includes M Doppler analysis processing units 3$a$-1 to 3$a$-M and a reception signal vector calculation unit 3$b$.

The Doppler analysis unit 3 calculates Doppler spectra $x_{m,k}(n)$ for each range bin (k) from the reception signals of the respective reception antennas 1-$m$ in the reception antennas 1-$l$ to 1-M. "n" is a variable indicating Doppler bin, and n=1, . . . , N. "N" is an integer greater than or equal to 2. "k" is a variable indicating range bin, and k=1, . . . , K. K is an integer greater than or equal to 1.

The Doppler analysis unit 3 calculates, for each range bin (k), a reception signal vector $x_k(n)$ including M Doppler spectra $x_{m,k}(n)$ for the range bin (k) calculated from the reception signals of the respective reception antennas 1-$m$.

The Doppler analysis unit 3 outputs the calculated reception signal vector $x_k(n)$ for each range bin (k) to the correlation matrix calculation unit 4, the Doppler bin detection unit 5, and the beam formation unit 8.

The Doppler analysis processing unit 3$a$-$m$ is achieved by, for example, a Doppler analysis processing circuit 21 shown in FIG. 2.

The Doppler analysis processing unit 3$a$-$m$ calculates, for each range bin (k), a Doppler spectrum $x_{m,k}(n)$ by Fourier transformation of the reception signal of the reception antenna 1-$m$, for example.

The Doppler analysis processing unit 3$a$-$m$ outputs the calculated Doppler spectrum $x_{m,k}(n)$ for each range bin (k) to the reception signal vector calculation unit 3$b$.

The reception signal vector calculation unit 3$b$ is achieved by, for example, a vector calculation circuit 22 shown in FIG. 2.

The reception signal vector calculation unit 3$b$ calculates, for each range bin (k), a reception signal vector $x_k(n)$ including M Doppler spectra $x_{m,k}(n)$ in the range bin (k) calculated by the Doppler analysis processing units 3$a$-1 to 3$a$-M.

The reception signal vector calculation unit 3$b$ outputs the calculated reception signal vector $x_k(n)$ for each range bin (k) to the correlation matrix calculation unit 4, the Doppler bin detection unit 5, and the beam formation unit 8.

The correlation matrix calculation unit 4 is achieved by, for example, a correlation matrix calculation circuit 23 shown in FIG. 2.

The correlation matrix calculation unit 4 calculates, for each range bin (k), a correlation matrix $R_{x,k}$ hat regarding the reception signal vector $x_k(n)$ for each range bin (k) calculated by the Doppler analysis unit 3. In the text of the specification, the symbol "^" cannot be written above the character "$R_{x,k}$" because of the electronic application, so it is written as "$R_{x,k}$ hat".

The correlation matrix calculation unit 4 outputs the calculated correlation matrix $R_{x,k}$ hat to the Doppler bin detection unit 5 and the target signal removal unit 6.

The Doppler bin detection unit 5 is achieved by, for example, a Doppler bin detection circuit 24 shown in FIG. 2.

The Doppler bin detection unit 5 detects, for each range bin (k), a target Doppler bin $n_{s,k}$ which is a Doppler bin where the target signal is present, from the correlation matrix $R_{x,k}$ hat for each range bin (k) calculated by the correlation matrix calculation unit 4 and the reception signal vector $x_k(n)$ for each range bin (k) calculated by the Doppler analysis unit 3.

The Doppler bin detection unit 5 outputs the detected target Doppler bin $n_{s,k}$ for each range bin (k) to the target signal removal unit 6.

The target signal removal unit 6 is achieved by, for example, a target signal removal circuit 25 shown in FIG. 2.

The target signal removal unit 6 removes the target signal in the target Doppler bin $n_{s,k}$ for each range bin (k) detected by the Doppler bin detection unit 5 from the correlation matrix $R_{x,k}$ hat for each range bin (k) calculated by the correlation matrix calculation unit 4 and thereby calculates, for each range bin (k), a target-signal-removed correlation matrix $R_{x,k}^{(Pro)}$ hat from which the target signal has been removed. In the text of the specification, the symbol "^" cannot be written above the character "$R_{x,k}^{(Pro)}$" because of the electronic application, so it is written as "$R_{x,k}^{(Pro)}$ hat".

The target signal removal unit 6 outputs the calculated target-signal-removed correlation matrix $R_{x,k}^{(Pro)}$ hat for each range bin (k) to the weighting calculation unit 7.

The weighting calculation unit 7 is achieved by, for example, a weighting calculation circuit 26 shown in FIG. 2.

The weighting calculation unit 7 calculates an adaptive weighting $w_{A,k}$ of the reception signal vector $x_k(n)$ for each range bin (k) from the target-signal-removed correlation matrix $R_{x,k}^{(Pro)}$ hat for each range bin (k) calculated by the target signal removal unit 6.

The weighting calculation unit 7 outputs the calculated adaptive weighting $w_{A,k}$ for each range bin (k) to the beam formation unit 8.

The beam formation unit 8 is achieved by, for example, a beam formation circuit 27 shown in FIG. 2.

The beam formation unit 8 forms, for each range bin (k), an adaptive beam $y_k(n)$ on the basis of the reception signal vector $x_k(n)$ for each range bin (k) calculated by the Doppler analysis unit 3 and the adaptive weighting $w_{A,k}$ for each range bin (k) calculated by the weighting calculation unit 7.

The beam formation unit 8 outputs the formed adaptive beam $y_k(n)$ for each range bin (k) to the target detection unit 9.

The target detection unit 9 is achieved by, for example, a target detection circuit 28 shown in FIG. 2.

The target detection unit 9 detects a target from the adaptive beam $y_k(n)$ for each range bin (k) formed by the beam formation unit 8.

In FIG. 1, it is assumed that the Doppler analysis processing units 3a-1 to 3a-M, the reception signal vector calculation unit 3b, the correlation matrix calculation unit 4, the Doppler bin detection unit 5, the target signal removal unit 6, the weighting calculation unit 7, the beam formation unit 8, and the target detection unit 9, those of which are the components of the signal processing unit 2, are each achieved by dedicated hardware shown in FIG. 2. That is, it is assumed that the signal processing unit 2 is achieved by the Doppler analysis processing circuit 21, the vector calculation circuit 22, the correlation matrix calculation circuit 23, the Doppler bin detection circuit 24, the target signal removal circuit 25, the weighting calculation circuit 26, and the beam formation circuit 27. Further, it is assumed that the target detection unit 9 is achieved by the target detection circuit 28.

Here, each of the Doppler analysis processing circuit 21, the vector calculation circuit 22, the correlation matrix calculation circuit 23, the Doppler bin detection circuit 24, the target signal removal circuit 25, the weighting calculation circuit 26, the beam formation circuit 27, and the target detection circuit 28 is, for example, a single circuit, a composite circuit, a programmed processor, a parallel programmed processor, an application specific integrated circuit (ASIC), a field-programmable gate array (FPGA), or a combination of some of these circuits.

Each of the components of the signal processing unit 2 and the target detection unit 9 are not limited to what is implemented by dedicated hardware. The signal processing unit 2 and the target detection unit 9 may be implemented by software, firmware, or a combination of software and firmware.

Software or firmware is stored in a memory of a computer as a program. The computer means hardware that executes the program, and may be, for example, a central processing unit (CPU), a central processor, a processing unit, a computing unit, a microprocessor, a microcomputer, a processor, or a digital signal processor (DSP).

Figure 3:
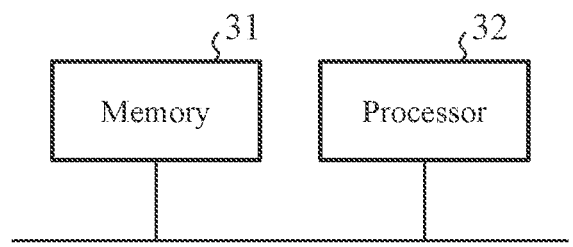

FIG. 3 is a diagram showing a hardware configuration of a computer when the signal processing unit 2 and the target detection unit 9 are achieved by software, firmware, or the like.

When the signal processing unit 2 and the target detection unit 9 are achieved by software, firmware, or the like, a program to cause the computer to execute the processing procedures performed in the Doppler analysis processing units 3a-1 to 3a-M, the reception signal vector calculation unit 3b, the correlation matrix calculation unit 4, the Doppler bin detection unit 5, the target signal removal unit 6, the weighting calculation unit 7, the beam formation unit 8, and the target detection unit 9 is stored in a memory 31. Then, the processor 32 of the computer executes the program stored in the memory 31.

Figure 4:
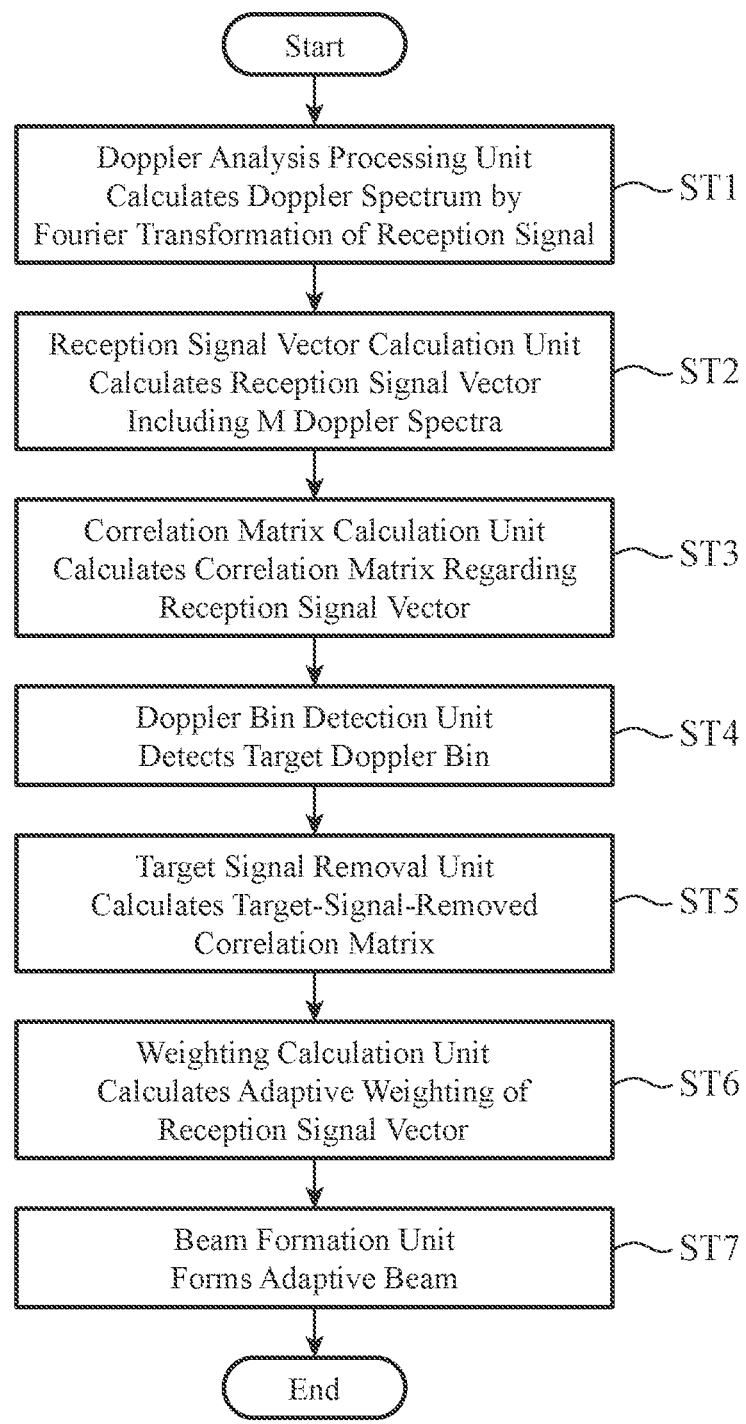
FIG. 4 is a flowchart showing a beam formation method which is a processing procedure of the signal processing unit 2.

FIG. 4 is a flowchart showing a beam formation method which is a processing procedure of the signal processing unit 2.

Further, FIG. 2 shows an example in which the components of the signal processing unit 2 and the target detection unit 9 are achieved by dedicated hardware, and FIG. 3 shows an example in which the signal processing unit 2 and the target detection unit 9 are achieved by software, firmware, or the like. However, they are merely examples, and some components of the signal processing unit 2 or the target detection unit 9 may be achieved by dedicated hardware, and the remaining components or the target detection unit 9 may be achieved by software, firmware, or the like.

Figure 5:
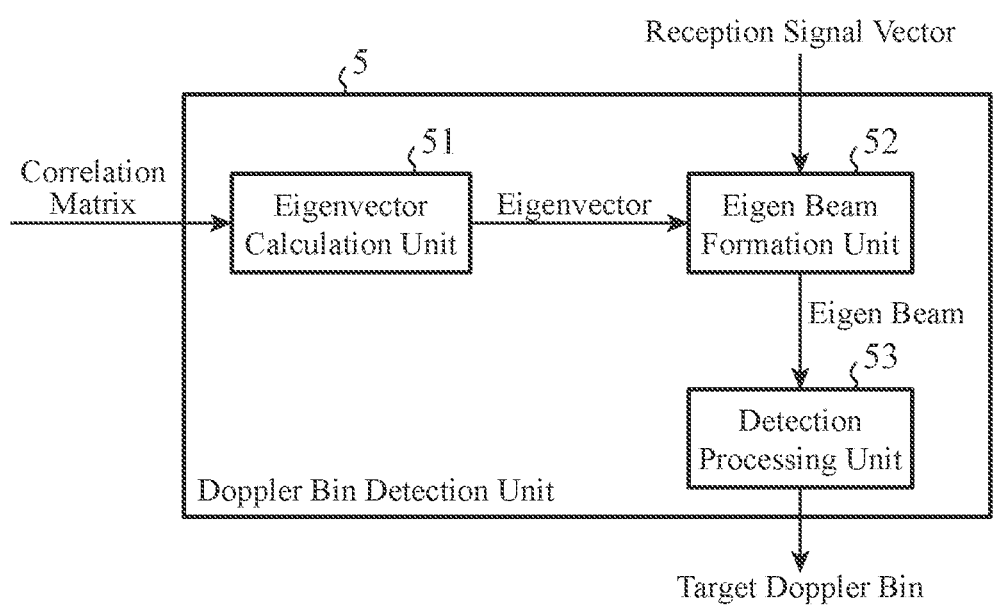
FIG. 5 is a diagram showing a configuration of a Doppler bin detection unit 5 in the beam formation device according to the first embodiment.

FIG. 5 is a diagram showing a configuration of the Doppler bin detection unit 5 in the beam formation device according to the first embodiment.

In FIG. 5, an eigenvector calculation unit 51 calculates, for each range bin (k), multiple eigenvectors $e_{m,k}$ in the correlation matrix $R_{x,k}$ hat for each range bin (k) calculated by the correlation matrix calculation unit 4.

The eigenvector calculation unit 51 outputs the calculated multiple eigenvectors $e_{m,k}$ for each range bin (k) to an eigen beam formation unit 52.

The eigen beam formation unit 52 forms, for each range bin (k), multiple eigen beams $z_{m,k}(n)$ on the basis of the multiple eigenvectors $e_{m,k}$ calculated by the eigenvector calculation unit 51 and the reception signal vector $x_k(n)$ calculated by the Doppler analysis unit 3, using the multiple eigenvectors $e_{m,k}$ as beam weighting for the reception signal vector $x_k(n)$.

The eigen beam formation unit 52 outputs the formed multiple eigen beams $z_{m,k}(n)$ for each range bin (k) to a detection processing unit 53.

The detection processing unit 53 compares, for each range bin (k), the Doppler spectra of the multiple eigen beams $z_{m,k}(n)$ formed by the eigen beam formation unit 52 with a threshold Th.

The detection processing unit 53 detects a target Doppler bin $n_{s,k}$ on the basis of the comparison result between the Doppler spectra of the multiple eigen beams $z_{m,k}(n)$ and the threshold Th.

The detection processing unit 53 outputs the detected target Doppler bin $n_{s,k}$ for each range bin (k) to the target signal removal unit 6.

The threshold Th may be stored in an internal memory of the detection processing unit 53 or may be given from the outside.

Next, the operation of the radar device shown in FIG. 1 will be described.

The transmission wave radiated from the transmission antenna of the radar device shown in FIG. 1 or transmission wave radiated from a transmission antenna of a radar device different from the radar device shown in FIG. 1 propagates along the surface of the sea and is reflected by a target on or above the sea.

The transmission wave reflected by the target propagates along the sea surface as a target signal and is received by the reception antennas 1-1 to 1-M.

In addition, a portion of the transmission wave propagates to the sky and is reflected by the ionosphere in the atmosphere.

The transmission wave reflected by the ionosphere in the atmosphere propagates in the air as an ionospheric clutter and is received by the reception antennas 1-1 to 1-M.

The reception antenna **1-*m* (m=1, . . . , M) receives the target signal and the ionospheric clutter, and outputs a reception signal including the target signal and the ionospheric clutter to the Doppler analysis processing unit 3*a-m***.

The Doppler analysis processing unit **3*a-m* calculates the Doppler spectrum $x_{m,k}(n)$ for each range bin (k) by, for example, Fourier transformation of the reception signal from the reception antenna 1-*m* (step ST1 in FIG. 4**).

The Doppler analysis processing unit **3*a-m* outputs the calculated Doppler spectrum $x_{m,k}(n)$ for each range bin (k) to the reception signal vector calculation unit 3*b***.

As represented by Equation (1) below, the reception signal vector calculation unit **3*b* calculates, for each range bin (k), the reception signal vector $x_k(n)$ including M Doppler spectra $x_{m,k}(n)$ in the range bin (k) calculated by the Doppler analysis processing units 3*a*-1 to 3*a*-M (step ST2 in FIG. 4**). Since the reception signal vector $x_k(n)$ is a vector, $x_k(n)$ is indicated in bold in Equation (1). However, in the text of the specification, the characters cannot be written in bold because of the electronic application, so $x_k(n)$ is written in lightface in the text of the specification.

$$x_k(n)=\{x_{1,k}(n),x_{2,k}(n),\ldots,x_{M,k}(n)\} \quad (1)$$

As represented by Equation (2) below, the reception signal vector $x_k(n)$ includes a target signal vector $s_k(n)$, an ionospheric clutter vector $c_k(n)$, and a noise vector $noise_k(n)$. Since the target signal vector $s_k(n)$, the ionospheric clutter vector $c_k(n)$, and the noise vector $noise_k(n)$ are vectors, $s_k(n)$, $c_k(n)$ and $noise_k(n)$ are written in bold in Equation (2). However, in the text of the specification, the characters cannot be written in bold because of the electronic application, so $s_k(n)$, $c_k(n)$ and $noise_k(n)$ are written in lightface in the text of the specification.

$$x_k(n)=s_k(n)+c_k(n)+noise_k(n) \quad (2)$$

In Equation (2), the reception signal vector $x_k(n)$ includes one target signal vector $s_k(n)$ and one ionospheric clutter vector $c_k(n)$ for the sake of simplicity. However, this is merely an example, and the reception signal vector $x_k(n)$ may include two or more target signal vectors $s_k(n)$. Further, the reception signal vector $x_k(n)$ may include two or more ionospheric clutter vectors $c_k(n)$.

In Equation (2), the sea clutter received by the reception antenna **1-*m*** is omitted. Sea clutter is a reflected wave from the surface of the sea.

The Doppler bin in which the Doppler spectrum of the sea clutter is distributed is determined by the Bragg scattering frequency determined by the wavelength of the transmission wave and the like. The reception signal vector calculation unit **3*b*** can remove the sea clutter from the reception signal vector $x_k(n)$ by changing the reception signal of the Doppler bin in which the Doppler spectrum of the sea clutter is distributed to zero.

The target signal vector $s_k(n)$ for each range bin (k) is expressed by the following Equation (3).

$$s_k(n) = a_k(\theta_{s,k})s_k(n) = a_k(\theta_{s,k})\sqrt{p_{s,k}}\,\text{sinc}(n-n_{s,k})\exp(j\phi_{s,k}) \quad (3)$$

In Equation (3), $s_k(n)$ in bold is the target signal vector in range bin (k), and $s_k(n)$ in lightface is the Doppler spectrum of the target signal in the range bin (k).

$a_k(\theta_{s,k})$ is a steering vector with respect to the direction of arrival $\theta_{s,k}$ of the target signal in the range bin (k). Since the steering vector $a_k(\theta_{s,k})$ is a vector, $a_k(\theta_{s,k})$ is indicated in bold in Equation (3). However, in the text of the specification, the characters cannot be written in bold because of the electronic application, so $a_k(\theta_{s,k})$ is written in lightface in the text of the specification.

$p_{s,k}$ is the power of the target signal in the range bin (k) received by the reception antenna **1-*m***, $n_{s,k}$ is the target Doppler bin in the range bin (k), $\varphi_{s,k}$ is an initial phase regarding the target signal in the range bin (k), and $\text{sinc}(n-n_{s,k})$ is a sinc function that represents the shape of the Doppler spectrum $s_k(n)$ of the target signal.

The Doppler spectrum $s_k(n)$ of the target signal is expressed by the following Equation (4), and is obtained by the N-point Fourier transform of the complex sine wave which is the time series data of the target signal.

$$s_k(n)=\sqrt{p_{s,k}}\,\text{sinc}(n-n_{s,k})\exp(j\phi_{s,k}) \quad (4)$$

The ionospheric clutter vector $c_k(n)$ for each range bin (k) is expressed by the following Equation (5).

$$c_k(n)=\alpha_k(\theta_{c,k})c_k(n) \quad (5)$$

In Equation (5), $c_k(n)$ in bold is the ionospheric clutter vector in range bin (k), and $c_k(n)$ in lightface is the Doppler spectrum of the ionospheric clutter in the range bin (k).

$a_k(\theta_{c,k})$ is a steering vector with respect to the direction of arrival $\theta_{c,k}$ of the ionospheric clutter in the range bin (k). Since the steering vector $a_k(\theta_{c,k})$ is a vector, $a_k(\theta_{c,k})$ is indicated in bold in Equation (5). However, in the text of the specification, the characters cannot be written in bold because of the electronic application, so $a_k(\theta_{c,k})$ is written in lightface in the text of the specification.

The Doppler spectrum $c_k(n)$ of the ionospheric clutter has a wider bandwidth than the doppler spectrum $s_k(n)$ of the target signal. The widening degree of the bandwidth of the Doppler spectrum $c_k(n)$ of the ionospheric clutter and the shape of the Doppler spectrum $c_k(n)$ differ depending on the state of the ionosphere.

The noise vector $noise_k(n)$ for each range bin (k) is a white noise spectrum that is uncorrelated between the reception signals received by the reception antennas 1-1 to 1-M. The average noise power of the noise vectors $noise_{m,k}(n)$ in the range bin (k) received by the reception antennas 1-1 to 1-M is $\sigma^2$.

When receiving the reception signal vector $x_k(n)$ for each range bin (k) from the reception signal vector calculation unit 3b, the correlation matrix calculation unit 4 calculates, for each range bin (k), the correlation matrix $R_{x,k}$ hat regarding the reception signal vector $x_k(n)$ in the range bin (k) as represented by Equation (6) below (step ST3 in FIG. 4).

$$\hat{R}_{x,k} = \sum_{n=1}^{N} x_k(n) x_k(n)^H \tag{6}$$

In Equation (6), H is a symbol indicating transposition.

The correlation matrix calculation unit 4 outputs the calculated correlation matrix $R_{x,k}$ hat for each range bin (k) to the Doppler bin detection unit 5 and the target signal removal unit 6.

When eigen value decomposition and eigenvector decomposition are performed on the correlation matrix $R_{x,k}$ hat, the correlation matrix $R_{x,k}$ hat is expressed by the following Equation (7).

$$\hat{R}_{x,k} = E_{D,k} \Lambda_{D,k} E_{D,k}^H + E_{n,k} \Lambda_{n,k} E_{n,k}^H \tag{7}$$

In Equation (7), D is the matrix rank of the incoming wave for the ionospheric clutter and the matrix rank of the incoming wave for the target signal, and D<M is established.

$E_{D,k}$ is an eigenvalue matrix of the incoming wave in the range bin (k) in which the eigenvectors $e_{m,k}$ (m=1, D) are arranged, and $\lambda_{D,k}$ is an eigenvalue matrix of the incoming wave in the range bin (k) in which the eigen values $\lambda_{m,k}$ corresponding to the eigenvectors $e_{m,k}$ (m=1, D) are arranged diagonally.

$E_{n,k}$ is an eigenvalue matrix of noise in the range bin (k) in which the eigenvectors $e_{m,k}$ (m=D+1, . . . , M) of noise are arranged, and $\lambda_{n,k}$ is an eigenvalue matrix of noise in the range bin (k) in which the eigen values $\lambda_{m,k}$ corresponding to the eigenvectors $e_{m,k}$ (m=D+1, . . . , M) of noise are arranged diagonally.

In the range bin (k), the subspace where the eigenvector $e_{m,k}$ of the incoming wave spans and the subspace where the steering vector $a_k(\theta_{s,k})$ regarding the direction of arrival $\theta_{s,k}$ of the target signal and the steering vector $a_k(\theta_{c,k})$ regarding the direction of arrival $\theta_{c,k}$ of the ionospheric clutter span are the same.

For example, when D=2, the subspace $apan(e_{1,k}, e_{2,k})$ where the eigenvectors $e_{1,k}$ and $e_{2,k}$ of the incoming wave span and the subspace $apan(a_k(\theta_{s,k}), a_k(\theta_{c,k}))$ where the steering vectors $a_k(\theta_{s,k})$ and $a_k(\theta_{c,k})$ span are represented by Equation (8) below.

$$span(e_{1,k}, e_{2,k}) = span(\alpha_k(\theta_{s,k}), \alpha_k(\theta_{c,k})) \tag{8}$$

Therefore, the eigenvectors $e_{1,k}$ and $e_{2,k}$ of the incoming wave in the range bin (k) can be represented by the linear combination of the steering vectors $a_k(\theta_{s,k})$ and $a_k(\theta_{c,k})$ as expressed in Equations (9) and (10) below.

$$e_{1,k} = \alpha_{11} \alpha_k(\theta_{s,k}) + a_{12} \alpha_k(\theta_{c,k}) \tag{9}$$

$$e_{2,k} = \alpha_{21} \alpha_k(\theta_{s,k}) + \alpha_{22} \alpha_k(\theta_{c,k}) \tag{10}$$

In Equations (9) and (10), $\alpha_{11}$, $\alpha_{12}$, $\alpha_{21}$, and $\alpha_{22}$ are coupling coefficients.

The Doppler bin detection unit 5 detects, for each range bin (k), a target Doppler bin $n_{s,k}$ from the correlation matrix $R_{x,k}$ hat for each range bin (k) and the reception signal vector $x_k(n)$ for each range bin (k) calculated by the Doppler analysis unit 3 (step ST4 in FIG. 4).

The Doppler bin detection unit 5 outputs the detected target Doppler bin $n_{s,k}$ for each range bin (k) to the target signal removal unit 6.

Now, the process for detecting the target Doppler bin $n_{s,k}$ by the Doppler bin detection unit 5 will be specifically described.

The eigenvector calculation unit 51 calculates, for each range bin (k), multiple eigenvectors $e_{m,k}$ of the incoming wave in the correlation matrix $R_{x,k}$ hat for each range bin (k) calculated by the correlation matrix calculation unit 4.

In the range bin (k), when, for example, D=2, the eigenvectors $e_{1,k}$ and $e_{2,k}$ of the incoming wave can be calculated by the above Equations (9) to (10).

The eigenvector calculation unit 51 outputs the calculated multiple eigenvectors $e_{m,k}$ of the incoming wave to the eigen beam formation unit 52.

The eigen beam formation unit 52 acquires the eigenvectors $e_{m,k}$ for each range bin (k) calculated by the eigenvector calculation unit 51 as beam weightings for the reception signal vector $x_k(n)$ of the range bin (k).

The eigen beam formation unit 52 forms, for each range bin (k), multiple eigen beams $z_{m,k}(n)$ of the incoming wave from the acquired eigenvectors $e_{m,k}$ for each range bin (k) and reception signal vector $x_k(n)$ for each range bin (k).

The eigen beam formation unit 52 outputs the formed multiple eigen beams $z_{m,k}(n)$ of the incoming wave for each range bin (k) to the detection processing unit 53.

In the range bin (k), when, for example, D=2, the eigen beam $z_{1,k}(n)$ of the incoming wave is expressed by Equation (11) below.

$$\begin{aligned} z_{1,k}(n) &= e_{1,k}^H x_k(n) = (a_{11} a_k(\theta_{s,k}) + \alpha_{12} a_k(\theta_{c,k}))^H \\ &\quad \left( a_k(\theta_{s,k}) \sqrt{p_{s,k}} \operatorname{sinc}(n - n_{s,k}) \exp(j\phi_{s,k}) + a_k(\theta_{c,k}) c_k(n) + \operatorname{noise}_k(n) \right) = \\ &\quad \alpha_{11}^* a_k^H(\theta_{s,k}) a_k(\theta_{s,k}) \sqrt{p_{s,k}} \operatorname{sinc}(n - n_{s,k}) \exp(j\phi_{s,k}) + \\ &\quad \alpha_{11}^* a_k^H(\theta_{s,k}) a_k(\theta_{c,k}) c_k(n) + \alpha_{11}^* a_k^H(\theta_{s,k}) \operatorname{noise}_k(n) + \\ &\quad \alpha_{12}^* a_k^H(\theta_{c,k}) a_k(\theta_{s,k}) \sqrt{p_{s,k}} \operatorname{sinc}(n - n_{s,k}) \exp(j\phi_{s,k}) + \\ &\quad a_{12}^* a_k^H(\theta_{c,k}) a_k(\theta_{c,k}) c_k(n) + \alpha_{12}^* a_k^H(\theta_{c,k}) \operatorname{noise}_k(n) = \\ &\quad \alpha_{11}^* M \sqrt{p_{s,k}} \operatorname{sinc}(n - n_{s,k}) \exp(j\phi_{s,k}) + \alpha_{11}^* a_k^H(\theta_{s,k}) a_k(\theta_{c,k}) c_k(n) + \\ &\quad \left( a_{11}^* a_k^H(\theta_{s,k}) + \alpha_{12}^* a_k^H(\theta_{c,k}) \right) \operatorname{noise}_k(n) + \\ &\quad \left( \alpha_{12}^* a_k^H(\theta_c) a_k(\theta_{s,k}) \sqrt{p_{s,k}} \operatorname{sinc}(n - n_{s,k}) \exp(j\phi_{s,k}) + a_{12}^* M c_k(n) \approx \end{aligned} \tag{11}$$

-continued $$\alpha_{11}^* M \sqrt{p_{s,k}} \operatorname{sinc}(n-n_{s,k})\exp(j\phi_{s,k}) + \alpha_{12}^* M c_k(n) + n_1^{(eig)}(n)$$

$$\alpha_k^H(\theta_{s,k})\alpha_k(\theta_{s,k}) = \alpha_k^H(\theta_{c,k})\alpha_k(\theta_{c,k}) = M \quad (12)$$

$$n_1^{(eig)}(n) = (\alpha_{m1}^* \alpha_k^H(\theta_{s,k}) + \alpha_{12}^* \alpha_k^H(\theta_{c,k}))\text{noise}_k(n) \quad (13)$$

The approximation of the last line in Equation (11) is based on the approximation indicated in Equation (14) below, assuming that the direction of arrival $\theta_{s,k}$ of the target signal and the direction of arrival $\theta_{c,k}$ of the ionospheric clutter are distant from each other.

$$\alpha_k^H(\theta_{c,k})\alpha_k(\theta_{s,k}) \approx 0 \quad (14)$$

In the range bin (k), the eigen beam $z_{2,k}(n)$ of the incoming wave is expressed by Equation (15) below.

$$z_{2,k}(n) = \quad (15)$$
$$e_{2,k}^H x_k(n) \approx \alpha_{21}^* M \sqrt{p_{s,k}} \operatorname{sinc}(n-n_{s,k})\exp(j\phi_{s,k}) + \alpha_{22}^* M c_k(n) + n_2^{(eig)}(n)$$

$$n_2^{(eig)}(n) = (\alpha_{21}^* \alpha_k^H(\theta_{s,k}) + \alpha_{22}^* \alpha_k^H(\theta_{c,k}))\text{noise}_k(n) \quad (16)$$

As represented by the following Equation (17), the eigenvector $e_{m,k}$ of noise and the steering vectors $\alpha_k(\theta_{s,k})$ and $a_k(\theta_{c,k})$ are orthogonal to each other. Therefore, the eigen beam $z_{m,k}(n)$ of noise corresponding to m=3, ..., M does not include incoming wave, and thus is represented by Equation (18) below.

$$e_{m,k}^H \alpha_k(\theta_{s,k}) = e_{m,k}^H \alpha_k(\theta_{c,k}) = 0 \quad (17)$$

$$z_{m,k}(n) = n_m^{(eig)}(n) \quad (18)$$

$$n_m^{(eig)}(n) = (\alpha_{m1}^* \alpha_k^H(\theta_{s,k}) + \alpha^{m2*} \alpha_k^H(\theta_{c,k}))\text{noise}_k(n) \quad (19)$$

In Equation (19), $\alpha_{m1}$ and $\alpha_{m2}$ are coupling coefficients.

As represented in Equations (11) and (15), the eigen beams $z_{1,k}(n)$ and $z_{2,k}(n)$ of the incoming wave have amplitudes obtained by combining the target Doppler spectrum having a peak in the target Doppler bin $n_{s,k}$ and the ionospheric clutter with a wider bandwidth. The noise eigen beam has an amplitude of a white noise spectrum.

The detection processing unit 53 compares, for each range bin (k), the Doppler spectra of the multiple eigen beams $z_{m,k}(n)$ formed by the eigen beam formation unit 52 with the threshold Th.

The detection processing unit 53 detects a Doppler bin corresponding to the Doppler spectrum larger than the threshold Th as a target Doppler bin $n_{s,k}$ on the basis of the comparison result between the Doppler spectra of the multiple eigen beams $z_{m,k}(n)$ and the threshold Th.

The detection processing unit 53 outputs the detected target Doppler bin $n_{s,k}$ for each range bin (k) to the target signal removal unit 6.

Although the method for setting the threshold Th used for comparison with the eigen beam $z_{m,k}(n)$ is not particularly limited, the detection processing unit 53 can set the threshold Th using, for example, constant false alarm rate (CFAR) processing.

The detection processing unit 53 outputs the detected target Doppler bin $n_{s,k}$ to the target signal removal unit 6.

The reason why the detection processing unit 53 compares the Doppler spectra of all the eigen beams $z_{m,k}(n)$ formed by the eigen beam formation unit 52 with the threshold Th is because it is difficult to classify the eigen beam of the incoming wave and the eigen beam of noise in advance.

The target signal removal unit 6 acquires the correlation matrix $R_{x,k}$ hat for each range bin (k) calculated by the correlation matrix calculation unit 4 and the target Doppler bin $n_{s,k}$ for each range bin (k) detected by the Doppler bin detection unit 5.

As represented by Equation (20) below, the target signal removal unit 6 removes the target signal in the target Doppler bin $n_{s,k}$ for the range bin (k) from the correlation matrix $R_{x,k}$ hat for the range bin (k) and thereby calculates, for each range bin (k), a target-signal-removed correlation matrix $R_{x,k}^{(Pro)}$ hat from which the target signal has been removed (step ST5 in FIG. 4).

$$\hat{R}_{x,k}^{(Pro)} = \hat{R}_{x,k} - x_k(n_{s,k})x_k(n_{s,k})^H \quad (20)$$

The target signal removal unit 6 outputs the calculated target-signal-removed correlation matrix $R_{x,k}^{(Pro)}$ hat for each range bin (k) to the weighting calculation unit 7.

The weighting calculation unit 7 acquires the target-signal-removed correlation matrix $R_{x,k}^{(Pro)}$ hat for each range bin (k) calculated by the target signal removal unit 6.

As represented by Equation (21) below, the weighting calculation unit 7 calculates, for each range bin (k), the adaptive weighting $w_{A,k}$ for the reception signal vector $x_k(n)$ of the range bin (k) from the target-signal-removed correlation matrix $R_{x,k}^{(Pro)}$ hat of the range bin (k) (step ST6 in FIG. 4). Since the adaptive weighting $w_{A,k}$ is a vector, $w_{A,k}$ is indicated in bold in Equation (21). However, in the text of the specification, the characters cannot be written in bold because of the electronic application, so $w_{A,k}$ is written in lightface in the text of the specification.

$$w_{A,k} = \beta[\hat{R}_{x,k}^{(Pro)}]^{-1} a_k(\theta_0) \quad (21)$$

In Equation (20), $\theta_0$ is the direction of the main beam in the adaptive beam $y_k(n)$ formed by the beam formation unit 8 described later, and $\beta$ is a normalization coefficient.

The normalization coefficient $\beta$ may be stored in the internal memory of the weighting calculation unit 7, or may be given from the outside. Further, the normalization coefficient $\beta$ may assume any value as long as it normalizes the adaptive weighting $w_{A,k}$.

The weighting calculation unit 7 outputs the calculated adaptive weighting $w_{A,k}$ for each range bin (k) to the beam formation unit 8.

The beam formation unit 8 acquires the reception signal vector $x_k(n)$ for each range bin (k) calculated by the Doppler analysis unit 3 and the adaptive weighting $w_{A,k}$ for each range bin (k) calculated by the weighting calculation unit 7.

As represented by Equation (22) below, the beam formation unit 8 forms, for each range bin (k), the adaptive beam $y_k(n)$ from the reception signal vector $x_k(n)$ for the range bin (k) and the adaptive weighting $w_{A,K}$ of the range bin (k) (step ST7 in FIG. 4).

$$y_k(n) = w_{A,k}^H x_k(n) \quad (22)$$

The adaptive beam $y_k(n)$ of the range bin (k) formed by the beam formation unit 8 is a beam in which nulls are formed in the direction of arrival $\theta_{c,k}$ of the ionospheric clutter in the range bin (k) and the target signal arrives in the main beam.

The beam formation unit 8 outputs the formed adaptive beam $y_k(n)$ for each range bin (k) to the target detection unit 9.

The target detection unit 9 acquires the adaptive beam $y_k(n)$ for each range bin (k) formed by the beam formation unit 8.

The target detection unit 9 detects a target from the adaptive beam $y_k(n)$ of the range bin (k) by performing a target detection process such as multiple signal classification (MUSIC) method for each range bin (k).

In the above first embodiment, the beam formation device includes: the Doppler bin detection unit 5 that detects a target Doppler bin which is a Doppler bin in which a target signal is present, from the correlation matrix calculated by the correlation matrix calculation unit 4 and the reception signal vector calculated by the Doppler analysis unit 3; the target signal removal unit 6 that removes, from the correlation matrix calculated by the correlation matrix calculation unit 4, the target signal in the target Doppler bin detected by the Doppler bin detection unit 5 and thereby calculates a target-signal-removed correlation matrix from which the target signal has been removed; and the weighting calculation unit 7 that calculates an adaptive weighting of the reception signal vector calculated by the Doppler analysis unit 3 from the target-signal-removed correlation matrix calculated by the target signal removal unit 6. Further, the beam formation unit 8 of the beam formation device forms an adaptive beam from the reception signal vector calculated by the Doppler analysis unit 3 and the adaptive weighting calculated by the weighting calculation unit 7. Accordingly, the beam formation device can avoid a situation in which, even if the peak power of the Doppler spectrum of the target signal is smaller than the power of the Doppler spectrum of the ionospheric clutter, the target signal is suppressed together with the ionospheric clutter.

Second Embodiment

The second embodiment describes a beam formation device including a signal synthesis unit 10 for generating a synthesis signal of one or more reception signals.

Figure 6:
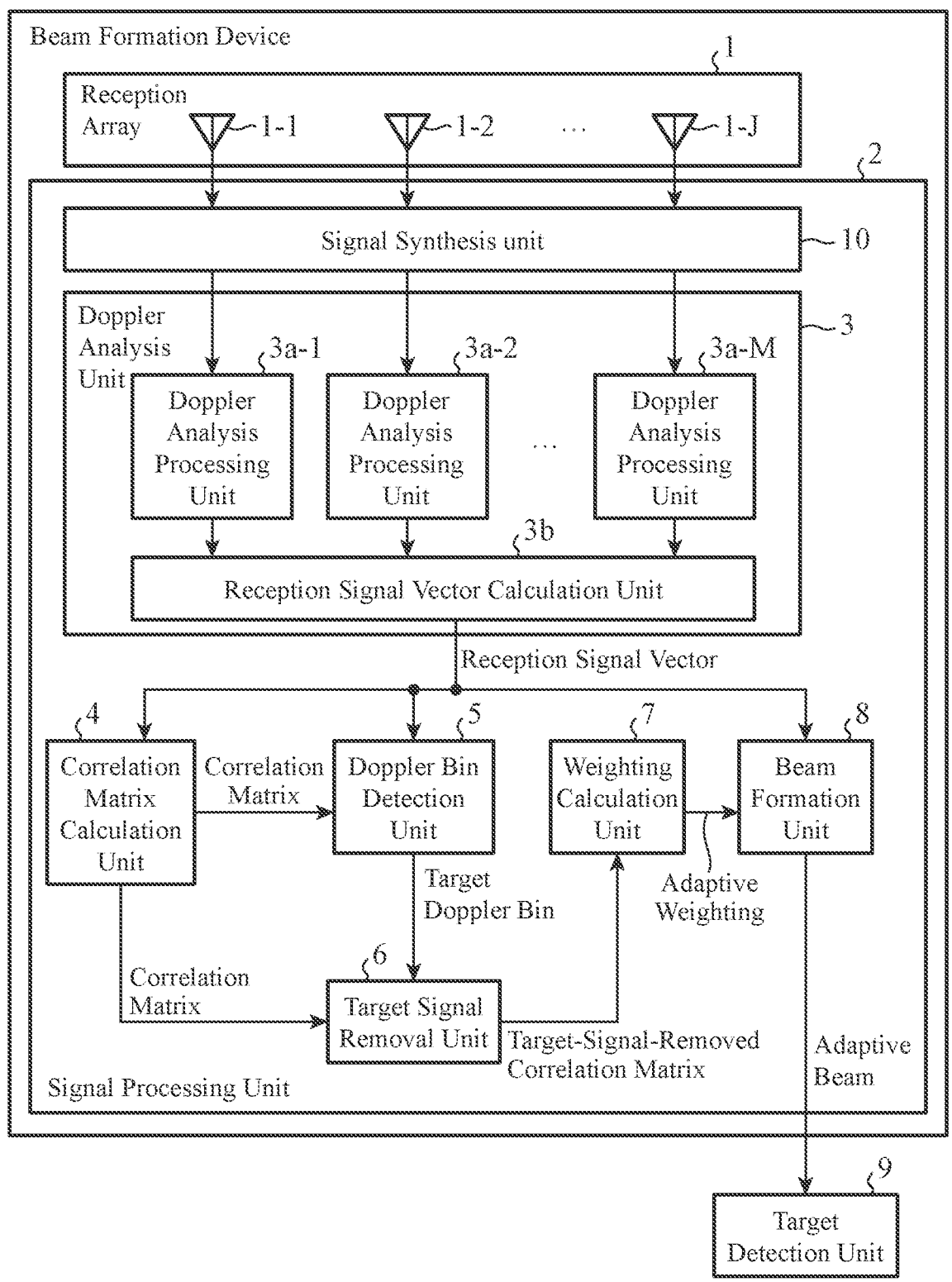
FIG. 6 is a diagram showing a configuration of a radar device including a beam formation device according to a second embodiment.

FIG. 6 is a diagram showing a configuration of a radar device including a beam formation device according to the second embodiment.

Figure 7:
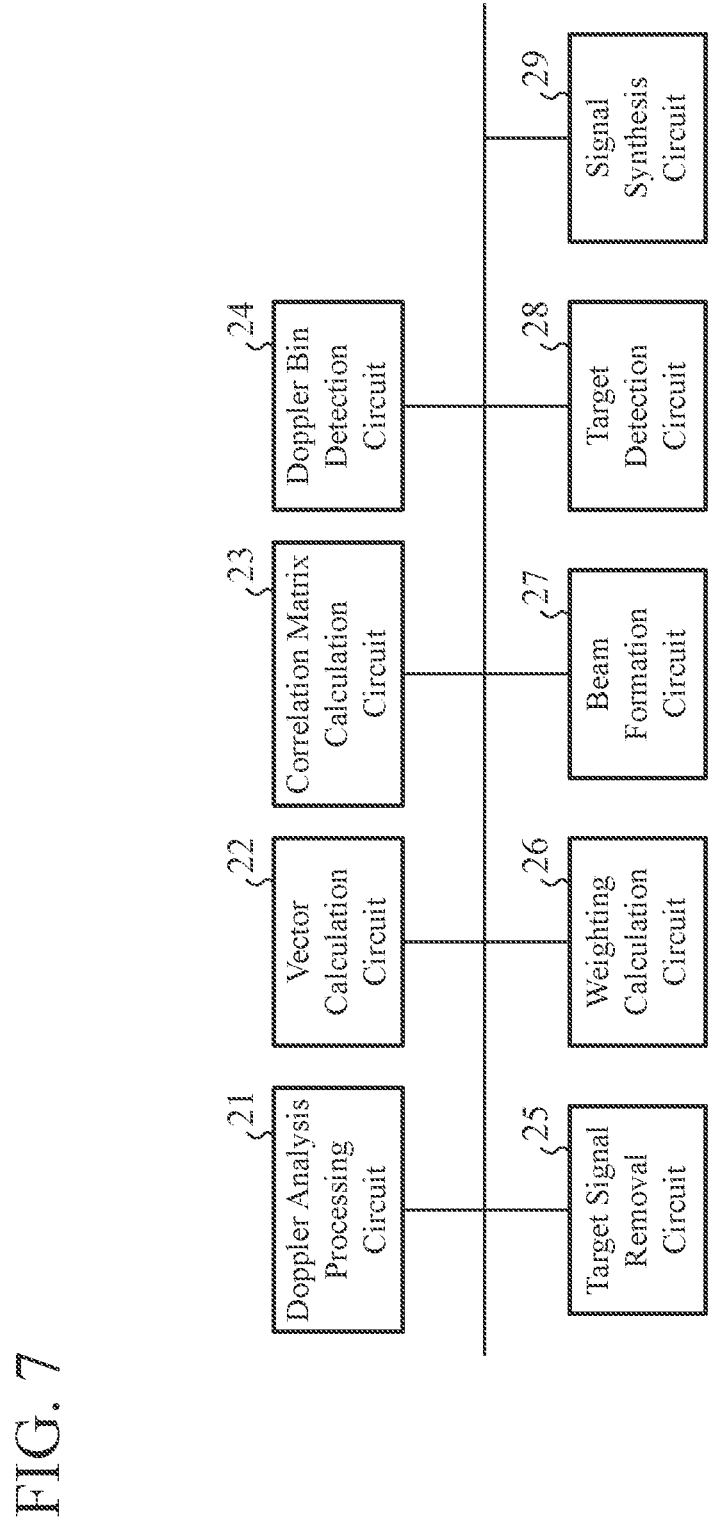
FIG. 7 is a hardware configuration diagram showing hardware of a signal processing unit 2 and a target detection unit 9 in the beam formation device according to the second embodiment.

FIG. 7 is a hardware configuration diagram showing hardware of a signal processing unit 2 and a target detection unit 9 in the beam formation device according to the second embodiment.

In FIGS. 6 and 7, elements same as or corresponding to the elements in FIGS. 1 and 2 are identified by the same reference numerals, and the description thereof will be omitted.

In the beam formation device shown in FIG. 6, it is assumed that the number of reception antennas 1-$m$ included in the reception array 1 is J ("J" is an integer greater than or equal to 2) for convenience of description, and m=1, ..., J. Note that, J>M may be established, J<M may be established, or J=M may be established.

The signal synthesis unit 10 is achieved by, for example, a signal synthesis circuit 29 shown in FIG. 7.

The signal synthesis unit 10 generates, for each combination of one or more reception signals among J reception signals in the reception antennas 1-1 to 1-J, a synthesis signal of one or more reception signals included in the combination.

The signal synthesis unit 10 outputs the generated synthesis signals to the Doppler analysis processing units 3$a$-1 to 3$a$-M.

In FIG. 6, it is assumed that the signal synthesis unit 10, the Doppler analysis processing units 3$a$-1 to 3$a$-M, the reception signal vector calculation unit 3$b$, the correlation matrix calculation unit 4, the Doppler bin detection unit 5, the target signal removal unit 6, the weighting calculation unit 7, the beam formation unit 8, and the target detection unit 9, those of which are the components of the signal processing unit 2, are each achieved by dedicated hardware as shown in FIG. 7. That is, it is assumed that the signal processing unit 2 is achieved by the signal synthesis circuit 29, the Doppler analysis processing circuit 21, the vector calculation circuit 22, the correlation matrix calculation circuit 23, the Doppler bin detection circuit 24, the target signal removal circuit 25, the weighting calculation circuit 26, and the beam formation circuit 27. Further, it is assumed that the target detection unit 9 is achieved by the target detection circuit 28.

Here, each of the signal synthesis circuit 29, the Doppler analysis processing circuit 21, the vector calculation circuit 22, the correlation matrix calculation circuit 23, the Doppler bin detection circuit 24, the target signal removal circuit 25, the weighting calculation circuit 26, the beam formation circuit 27, and the target detection circuit 28 is, for example, a single circuit, a composite circuit, a programmed processor, a parallel programmed processor, an ASIC, an FPGA, or a combination of some of these circuits.

Each of the components of the signal processing unit 2 and the target detection unit 9 are not limited to what is implemented by dedicated hardware. The signal processing unit 2 and the target detection unit 9 may be implemented by software, firmware, or a combination of software and firmware.

When the signal processing unit 2 and the target detection unit 9 are achieved by software, firmware, or the like, a program to cause the computer to execute the processing procedures performed in the signal synthesis unit 10, the Doppler analysis processing units 3$a$-1 to 3$a$-M, the reception signal vector calculation unit 3$b$, the correlation matrix calculation unit 4, the Doppler bin detection unit 5, the target signal removal unit 6, the weighting calculation unit 7, the beam formation unit 8, and the target detection unit 9 is stored in the memory 31 shown in FIG. 3. Then, the processor 32 of the computer shown in FIG. 3 executes the program stored in the memory 31.

Next, the operation of the radar device shown in FIG. 6 will be described.

The reception antenna 1-$m$ (m=1, ..., J) receives a target signal and an ionospheric clutter, and outputs a reception signal including the target signal and the ionospheric clutter to the signal synthesis unit 10.

The signal synthesis unit 10 acquires J reception signals output from the reception antennas 1-1 to 1-J.

In the signal synthesis unit 10, M combinations are determined in advance as combinations of one or more reception signals among J reception signals.

Any combination may be used as M combinations, and the M combinations are stored in an internal memory of the signal synthesis unit 10. The M combinations may be given from the outside.

Conceivable examples of M combinations of two reception signals include a combination of the reception signal of the reception antenna 1-1 and the reception signal of the reception antenna 1-2, a combination of the reception signal of the reception antenna 1-2 and the reception signal of the reception antenna 1-3, ... a combination of the reception signal of the reception antenna 1-(J-1) and the reception signal of the reception antenna 1-J, and a combination of the reception signal of the reception antenna 1-J and the reception signal of the reception antenna 1-1.

Conceivable examples of M combinations of three reception signals include a combination of the reception signal of the reception antenna 1-1, the reception signal of the reception antenna 1-2, and the reception signal of the reception antenna 1-3, a combination of the reception signal of the reception antenna 1-2, the reception signal of the reception antenna 1-3, and the reception signal of the reception antenna 1-4, . . . and a combination of the reception signal of the reception antenna 1-(J-2), the reception signal of the reception antenna 1-(J-1), and the reception signal of the reception antenna 1-J.

The signal synthesis unit 10 generates, for each combination, a synthesis signal of one or more reception signals included in the combination, and outputs the generated M synthesis signals to the Doppler analysis processing units 3a-1 to 3a-M.

The synthesis signal generated by the signal synthesis unit 10 corresponds to a sub-array beam, and the signal synthesis unit 10 can form a sub-array beam in a direction corresponding to a combination of one or more reception signals.

Due to the signal synthesis unit 10 forming the sub-array beam in the desired direction, it is possible to detect a target that is present in the desired direction.

The Doppler analysis processing unit 3a-m calculates the Doppler spectrum $x_{m,k}(n)$ for each range bin (k) by Fourier transformation of one of the M synthesis signals output from the signal synthesis unit 10 instead of the reception signal from the reception antenna 1-m.

The Doppler analysis processing unit 3a-m outputs the calculated Doppler spectrum $x_{m,k}(n)$ for each range bin (k) to the reception signal vector calculation unit 3b.

The subsequent processing is the same as that of the radar device shown in FIG. 1, and thus, detailed description thereof will be omitted.

It is to be noted that two or more of the above embodiments can be freely combined, or arbitrary components in the embodiments can be modified or omitted, within the scope of the present invention.

INDUSTRIAL APPLICABILITY

The present invention is suitable for a beam formation device, a radar device, and a beam formation method for forming an adaptive beam.

REFERENCE SIGNS LIST

1: reception array,
1-1 to 1-M, 1-J: reception antenna,
2: signal processing unit,
3: Doppler analysis unit,
3a-1 to 3a-M: Doppler analysis processing unit,
3b: reception signal vector calculation unit,
4: correlation matrix calculation unit,
5: Doppler bin detection unit,
6: target signal removal unit,
7: weighting calculation unit,
8: beam formation unit,
9: target detection unit,
10: signal synthesis unit,
21: Doppler analysis processing circuit,
22: vector calculation circuit,
23: correlation matrix calculation circuit,
24: Doppler bin detection circuit,
25: target signal removal circuit,
26: weighting calculation circuit,
27: beam formation circuit,
28: target detection circuit,
29: signal synthesis circuit,
31: memory,
32: processor,
51: eigenvector calculation unit,
52: eigen beam formation unit,
53: detection processing unit

The invention claimed is:

1. A beam formation device comprising:
    processing circuitry
        to calculate a Doppler spectrum from a reception signal of each of a plurality of reception antennas, and to calculate a reception signal vector including the Doppler spectrum calculated from the reception signal of each of the reception antennas,
        to calculate a correlation matrix regarding the reception signal vector,
        to detect a target Doppler bin that is a Doppler bin in which a target signal is present from the correlation matrix and the reception signal vector,
        to remove, from the correlation matrix, the target signal in the target Doppler bin so as to calculate a target-signal-removed correlation matrix from which the target signal has been removed,
        to calculate an adaptive weighting of the reception signal vector from the target-signal-removed correlation matrix, and
        to form an adaptive beam from the reception signal vector and the adaptive weighting.

2. The beam formation device according to claim 1, wherein the processing circuitry generates, from among reception signals of the plurality of reception antennas, synthesis signals of one or more reception signals, and
    the processing circuitry calculates a Doppler spectrum from each of the synthesis signals, and calculates a reception signal vector including the Doppler spectrum calculated from each of the synthesis signals.

3. The beam formation device according to claim 1, wherein
    the processing circuitry calculates Doppler spectrums of range bins from the reception signal of each of the reception antennas, and calculates, for each range bin, a reception signal vector including a Doppler spectrum of a corresponding range bin, calculated from the reception signal of each of the reception antennas,
    calculates, for each range bin, a correlation matrix regarding the reception signal vector for each range bin,
    detects, for each range bin, a target Doppler bin which is a Doppler bin in which the target signal is present from the correlation matrix for each range bin and the reception signal vector for each range bin,
    removes the target signal in the target Doppler bin for each range bin from the correlation matrix for each range bin so as to calculate, for each range bin, a target-signal-removed correlation matrix from which the target signal has been removed,
    calculates an adaptive weighting of the reception signal vector for each range bin from the target-signal-removed correlation matrix for each range bin, and
    forms, for each range bin, an adaptive beam from the reception signal vector for each range bin and the adaptive weighting for each range bin.

4. The beam formation device according to claim 3, wherein the processing circuitry generates, from among reception signals of the plurality of reception antennas, synthesis signals of one or more reception signals, and calculates Doppler spectrums of range bins from each of the synthesis signals, and calculates, for each range bin, a reception signal vector including a Doppler spectrum of a corresponding range bin, calculated from each of the synthesis signals.

5. The beam formation device according to claim 1, wherein the processing circuitry calculates a plurality of eigenvectors in the correlation matrix, forms a plurality of eigen beams from the plurality of eigenvectors and the reception signal vector, using the plurality of eigenvectors as a beam weighting for the reception signal vector, and compares Doppler spectra of the plurality of eigen beams and a threshold, and detects the target Doppler bin on the basis of the comparison result between the Doppler spectra of the plurality of eigen beams and the threshold.

6. A radar device comprising:

processing circuitry to calculate a Doppler spectrum from a reception signal of each of a plurality of reception antennas, and calculate a reception signal vector including the Doppler spectrum calculated from the reception signal of each of the reception antennas, to calculate a correlation matrix regarding the reception signal vector, to detect a target Doppler bin that is a Doppler bin in which a target signal is present from the correlation matrix and the reception signal vector, to remove, from the correlation matrix, the target signal in the target Doppler bin so as to calculate a target-signal-removed correlation matrix from which the target signal has been removed, to calculate an adaptive weighting of the reception signal vector from the target-signal-removed correlation matrix, to form an adaptive beam from the reception signal vector and the adaptive weighting, and to detect a target from the adaptive beam.

7. A beam formation method comprising:

calculating a Doppler spectrum from a reception signal of each of a plurality of reception antennas, and calculating a reception signal vector including the Doppler spectrum calculated from the reception signal of each of the reception antennas, calculating a correlation matrix regarding the reception signal vector, detecting a target Doppler bin that is a Doppler bin in which a target signal is present from the correlation matrix and the reception signal vector, removing the target signal in the target Doppler bin from the correlation matrix, so as to calculate a target-signal-removed correlation matrix from which the target signal has been removed, calculating an adaptive weighting of the reception signal vector from the target-signal-removed correlation matrix, and forming an adaptive beam from the reception signal vector and the adaptive weighting.

\* \* \* \* \*